United States Patent
Rajagopal et al.

(10) Patent No.: US 11,720,401 B2
(45) Date of Patent: Aug. 8, 2023

(54) RECLAIMING AND REUSING PRE-BOOT RESERVED MEMORY POST-BOOT

(71) Applicant: Intel Corporation, Santa Clara, CA (US)

(72) Inventors: Pannerkumar Rajagopal, Bangalore (IN); Murali R Iyengar, Bangalore (IN); Karunakara Kotary, Portland, OR (US); Ovais Pir, Srinagar (IN); Sagar C Pawar, Bangalore (IN); Prakash Pillai, Bangalore (IN); Raghavendra N, Bangalore (IN); Aneesh A Tuljapurkar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 363 days.

(21) Appl. No.: 16/832,372

(22) Filed: Mar. 27, 2020

(65) Prior Publication Data

US 2020/0225994 A1 Jul. 16, 2020

(51) Int. Cl.
*G06F 9/4401* (2018.01)
*G06F 9/50* (2006.01)
*G06F 9/54* (2006.01)
*G06F 12/1009* (2016.01)
*G06T 1/60* (2006.01)

(52) U.S. Cl.
CPC .......... *G06F 9/5016* (2013.01); *G06F 9/4406* (2013.01); *G06F 9/544* (2013.01); *G06F 12/1009* (2013.01); *G06T 1/60* (2013.01)

(58) Field of Classification Search
CPC ...... G06F 9/5016; G06F 9/4406; G06F 9/544; G06F 12/1009; G06T 1/60
See application file for complete search history.

(56) References Cited

U.S. PATENT DOCUMENTS

| | | | |
|---|---|---|---|
| 6,009,520 A * | 12/1999 | Gharda | G06F 8/60 713/1 |
| 2004/0117568 A1 | 6/2004 | Zimmer et al. | |
| 2010/0241839 A1 * | 9/2010 | Banga | G06F 9/544 713/1 |
| 2016/0118121 A1 * | 4/2016 | Kelly | G06F 13/4282 710/301 |
| 2016/0314758 A1 * | 10/2016 | Moyes | G09G 5/39 |
| 2018/0032349 A1 | 2/2018 | Bhimanadhuni et al. | |
| 2019/0057000 A1 * | 2/2019 | Wszolek | G06F 11/0772 |
| 2021/0056016 A1 * | 2/2021 | Bulusu | G06F 12/0868 |
| 2021/0056042 A1 * | 2/2021 | Arora | G06F 12/1081 |

OTHER PUBLICATIONS

Jiewen Yao et al: White Paper—"A Tour beyond BIOS Memory Map Design in UEFI BIOS" Feb. 2015, pp. 1-27.
European Search Report and Written Opinion for the European Application No. 20213331, dated May 20, 2021, 8 pages.

* cited by examiner

*Primary Examiner* — Emerson C Puente
*Assistant Examiner* — Jonathan R Labud
(74) *Attorney, Agent, or Firm* — KDW Firm PLLC (57) ABSTRACT

Described is a system where memory can be allocated for use by an adapter pre-boot and preserved for use post-boot. A BIOS can allocate for pre-boot hardware operations (e.g., graphics drivers, framebuffers, etc.) and mark this allocated memory as preserved. An indication of the allocated memory can be provided for an OS, such that post-boot, the OS can reclaim and reallocate this memory.

21 Claims, 8 Drawing Sheets

RECLAIMING AND REUSING PRE-BOOT RESERVED MEMORY POST-BOOT

BACKGROUND

Computing devices allocate memory for various hardware components (e.g., graphic processing units, or the like) during initial booting of the computing device. This allocated memory is used for the hardware component during boot. However, post boot, this allocated memory is not available to the operating system. Said differently, this memory allocated during boot is not released or reclaimed post boot.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present disclosure is applicable to a number of different computing devices, such as, personal computers, workstations, servers, laptops, tablet computers, smartphones, computing devices with integrated system-on-chip (SoC) hardware components, wearable computing devices (e.g., smart watches, etc.), or other small form factor computing devices. It is to be appreciated that smaller form factor devices (e.g., smartphones, tablets, etc.) have fixed system memory while upgrading memory is impossible or unfeasible. Furthermore, graphic intensive applications and multitasking are common usage models in small form factor devices. Memory utilization plays a critical role in such applications. Furthermore, as computing devices are increasingly connected (e.g., Internet-of-Things (IoT), peer-to-peer (P2P), etc.) memory utilization play a key role in the user experience as multiple applications may be open and sharing data between connected devices.

Memory requirements in computing devices typically increase where display resolution increases. For example, during boot, the BIOS will need to allocate a minimum of 64 Megabytes (MB) of memory for a 5K display and 128 MB for a 8K display. In conventional systems, this allocated memory is not available post-boot. The present disclosure, however, provides that this memory can be reclaimed and reused post-boot.

In the present disclosure, memory reserved by a Basic Input Output System (BIOS) during booting of a computing device is not permanently hidden from an operating system (OS) during post-boot of the computing device. In general, the present disclosure defines a new memory type, which when allocated during boot can be reclaimed post-boot. For example, a BIOS can allocate for pre-boot hardware operations (e.g., graphics drivers, framebuffers, etc.) and mark this allocated memory as preserved. An indication of the allocated memory can be provided for an OS, such that post-boot, the OS can reclaim and reallocate this memory. For example, the BIOS can provide indications the allocated memory is preserved for post-boot based on inclusion of memory addresses for the preserved memory in a memory map provided to the OS. In some examples, the OS can release the preserved memory once additional memory has been allocated for the post-boot hardware operations.

In some examples, the memory type can be a new memory type, such as, defined in one or more Specifications. As a specific example, the memory type can be an EfiPreservedMemoryType and can be supported by the Extensible Firmware Interface (EFI) or the Unified EFI (UEFI) specifications promulgated by the UEFI Forum.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined, without limiting the scope to the embodiments disclosed herein.

Figure 1:
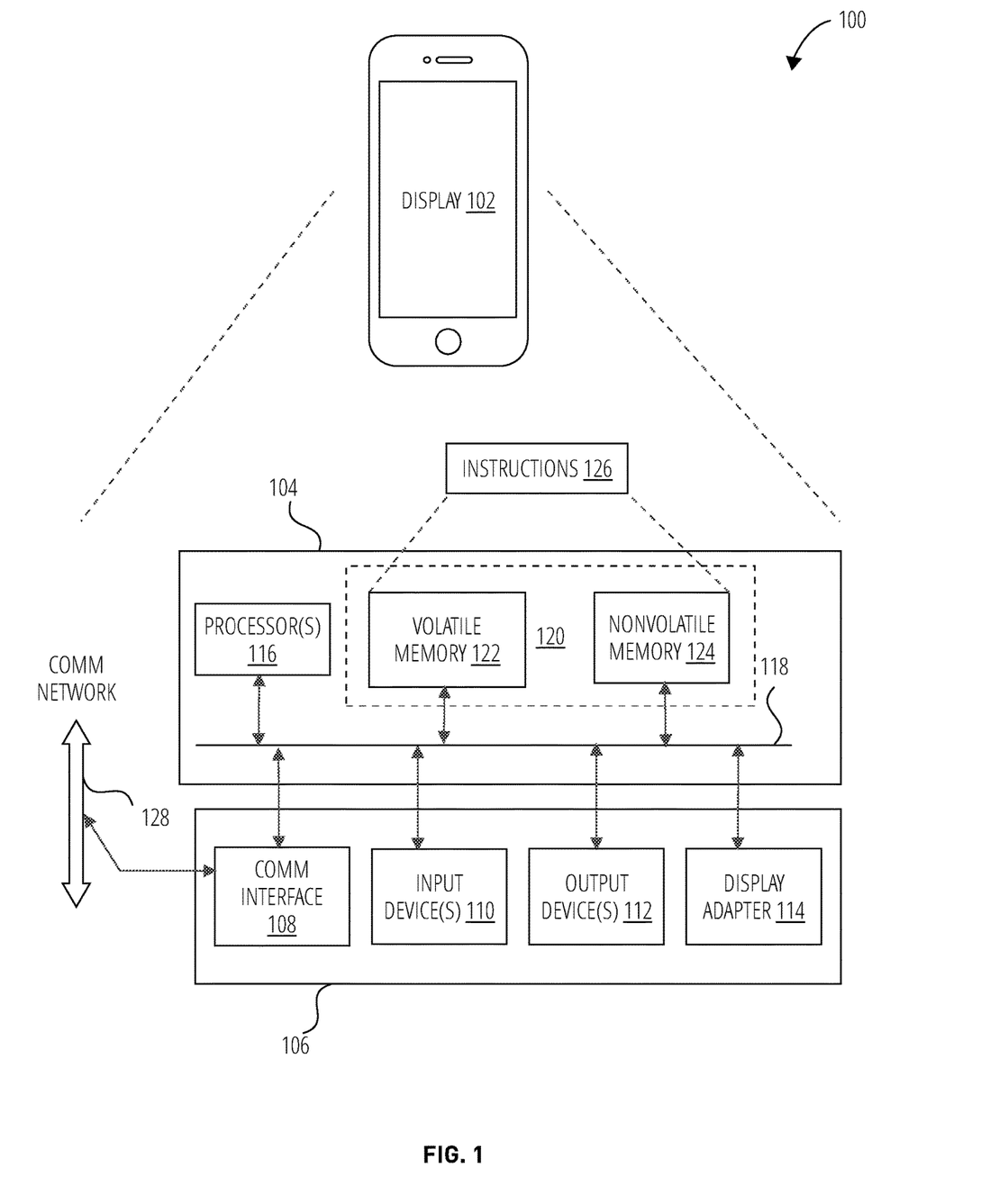
FIG. 1 is an example block diagram of a system 100 to preserve pre-boot allocated memory for post-boot.

FIG. 1 is an example block diagram of a system 100 that may incorporate embodiments of the present disclosure. In general, FIG. 1 is illustrative of a computing device or system to carry out aspects of the technical processes described herein, and does not limit the scope of the claims. One of ordinary skill in the art would recognize other variations, modifications, and alternatives. In one embodiment, the system 100 typically includes a display 102, computing components 104 and peripheral components 106. Peripheral components 106 can include a communication network interface 108, input device(s) 110, output device(s) 112, display adapter 114, and the like.

As depicted in FIG. 1, the computing components 104 may include one or more processor(s) 116 that communicate with other components of system 100 via a bus system 118. For example, processor(s) 116 are coupled to peripheral components 106 via bus system 118. Computing components 104 further includes memory storage devices forming a memory 120, which may include volatile memory 122 and/or nonvolatile memory 124. Volatile memory 122 and/or nonvolatile memory 124 may store computer-executable instructions 126, which when executed by the processor(s) 116 implement embodiments of the processes disclosed herein.

The input device(s) 110 include devices and mechanisms for inputting information to the computing components 104. These may include a keyboard, a keypad, a touch screen incorporated into the display 102, audio input devices such as voice recognition systems, microphones, and other types of input devices. In various embodiments, the input device(s) 110 may be embodied as a computer mouse, a trackball, a track pad, a joystick, wireless remote, drawing tablet, voice command system, eye tracking system, and the like. The input device(s) 110 typically allow a user to select objects, icons, control areas, text and the like that appear on the display 102 via a command such as a click of a button or the like.

The output device(s) 112 include devices and mechanisms for outputting information from the computing components 104. These may include the display 102, speakers, printers, infrared LEDs, and so on as well understood in the art. Display adapter 114 can include circuitry arranged to communicate display data to display 102. For example, display adapter 114 can be arranged to provide display data from a frame buffer (e.g., in memory 120) to display 102.

The communication network interface 108 provides an interface to communication networks (e.g., communication network 128) and devices external to the computing components 104. The communication network interface 108 may serve as an interface for receiving data from and transmitting data to other systems. Embodiments of the communication network interface 108 may include an Ethernet interface, a modem (cellular, 3G, LTE, 4G, 5G, satellite, cable, ISDN), (asynchronous) digital subscriber line (DSL), FireWire, USB, a wireless communication interface such as Bluetooth, or Wi-Fi, a near field communication wireless interface, and the like.

The communication network interface 108 may be coupled to the communication network 128 via an antenna, a cable, or the like. In some embodiments, the communication network interface 108 may be physically integrated on a circuit board of the computing components 104, or in some cases may be implemented in software or firmware, such as "soft modems", or the like. The system 100 may include logic that enables communications over a network using protocols such as HTTP, TCP/IP, RTP/RTSP, IPX, UDP and the like.

The processor(s) 116 can include multiple processors, a multi-threaded processor, a multi-core processor (whether the multiple cores coexist on the same or separate dies), and/or a multi-processor architecture of some other variety by which multiple physically separate processors are in some way linked. Additionally, in some examples, the processor(s) 116 may include graphics processing portions and may include dedicated memory, multiple-threaded processing and/or some other parallel processing capability. In some examples, the processor(s) 116 may be an application specific integrated circuit (ASIC) or a field programmable integrated circuit (FPGA). In some implementations, the processor(s) 116 may be circuitry arranged to perform particular computations, such as, related to artificial intelligence (AI) or graphics. Such circuitry may be referred to as an accelerator. Processor(s) 116 can include multiple processors, such as, for example, a central processing unit (CPU) and a graphics processing unit (GPU).

The volatile memory 122 and the nonvolatile memory 124 are examples of tangible media configured to store computer readable data and instructions to implement various embodiments of the processes described herein. Other types of tangible media include removable memory (e.g., pluggable USB memory devices, mobile device SIM cards), optical storage media such as CD-ROMs, DVDs, semiconductor memories such as flash memories, non-transitory read-only-memories (ROMS), dynamic random access memory (DRAM), NAND memory, NOR memory, phase-change memory, battery-backed volatile memories, networked storage devices, and the like.

The volatile memory 122 and the nonvolatile memory 124 may be configured to store the basic programming and data constructs that provide the functionality of the disclosed processes and other embodiments thereof that fall within the scope of the disclosure. The instructions 126 that implement embodiments of the disclosure may be stored in the volatile memory 122 and/or the nonvolatile memory 124. Instructions 126 may be read from the volatile memory 122 and/or nonvolatile memory 124 and executed by the processor(s) 116. The volatile memory 122 and the nonvolatile memory 124 may also provide a repository for storing data used by the instructions 126.

The volatile memory 122 and the nonvolatile memory 124 may include a number of memories including a main random access memory (RAM) for storage of instructions and data during program execution and a read only memory (ROM) in which read-only non-transitory instructions are stored. The volatile memory 122 and the nonvolatile memory 124 may include a file storage subsystem providing persistent (non-volatile) storage for program and data files. The volatile memory 122 and the nonvolatile memory 124 may include removable storage systems, such as removable flash memory.

The bus system 118 provides a mechanism for enabling the various components and subsystems of computing components 104 communicate with each other as intended. Although the communication network interface 108 is depicted schematically as a single bus, some embodiments of the bus system 118 may utilize multiple distinct busses.

It will be readily apparent to one of ordinary skill in the art that the system 100 may be a device such as a smartphone, a desktop computer, a laptop computer, a rack-mounted computer system, a computer server, a tablet computing device, a wearable computing device, or the like. Upon initial power on, system 100 will typically go through a boot-up process. During the initial boot process, hardware components such as the processor(s) 116 and peripheral components 106 need to be initialized. Likewise memory 120 needs to be allocated. Often, booting of a computing device such as system 100 is facilitated by BIOS software. The BIOS can be stored in memory 120, and particularly in nonvolatile memory 124. Upon initial power up of system 100, the processor(s) 116 can access the BIOS instructions and execute them to initialize the circuitry (e.g., processor(s) 116, peripheral components 106, etc.) of system 100 to prepare the system 100 to execute an OS or other application.

Initialization of hardware components often requires allocation of portions of memory 120. For example, to initialize display 102, display adapter 114 will need to be initialized. Additionally, portions of memory 120 will need to be allocated for graphics information (e.g., as a GOP Framebuffer, or the like) such that graphics information can be stored in the memory 120 and display adapter 114 can retrieve such graphical information (or data) and send the data to display 102. This is just one example. As another example, portions of memory 120 may need to be allocated to store communication information for communication network interface 108 to connect to communication network 128.

Conventionally, portions of memory 120 allocated during pre-boot operations are not released, or said differently, are hidden from post boot operations, such as, an operating system. As such, some portions of memory 120 allocated during pre-boot can be unavailable during post-boot. This can cause significant memory utilization issues for devices with limited memory (e.g., mobile devices, embedded devices, IoT devices, or the like).

System 100 however, is arranged such that processor(s) 116 while executing instructions 126 can allocate portions of memory 120 during pre-boot operations and mark these allocated portions of memory as preserved for post-boot operations. As such, the memory can be reclaimed during post boot. A non-limiting allocating of such would be allocating portions of memory 120 for graphics frame buffers. Conventionally, the memory allocated for graphics frame buffers during pore-boot is not accessible or available post boot. However, system 100 can mark this allocated portion of memory 120 as preserved such that the portion of memory 120 can be reclaimed by post boot instructions (e.g., by an OS after the OS has allocated post-boot graphics frame buffers from memory 120. This is explained in greater detail below.

Figure 2:
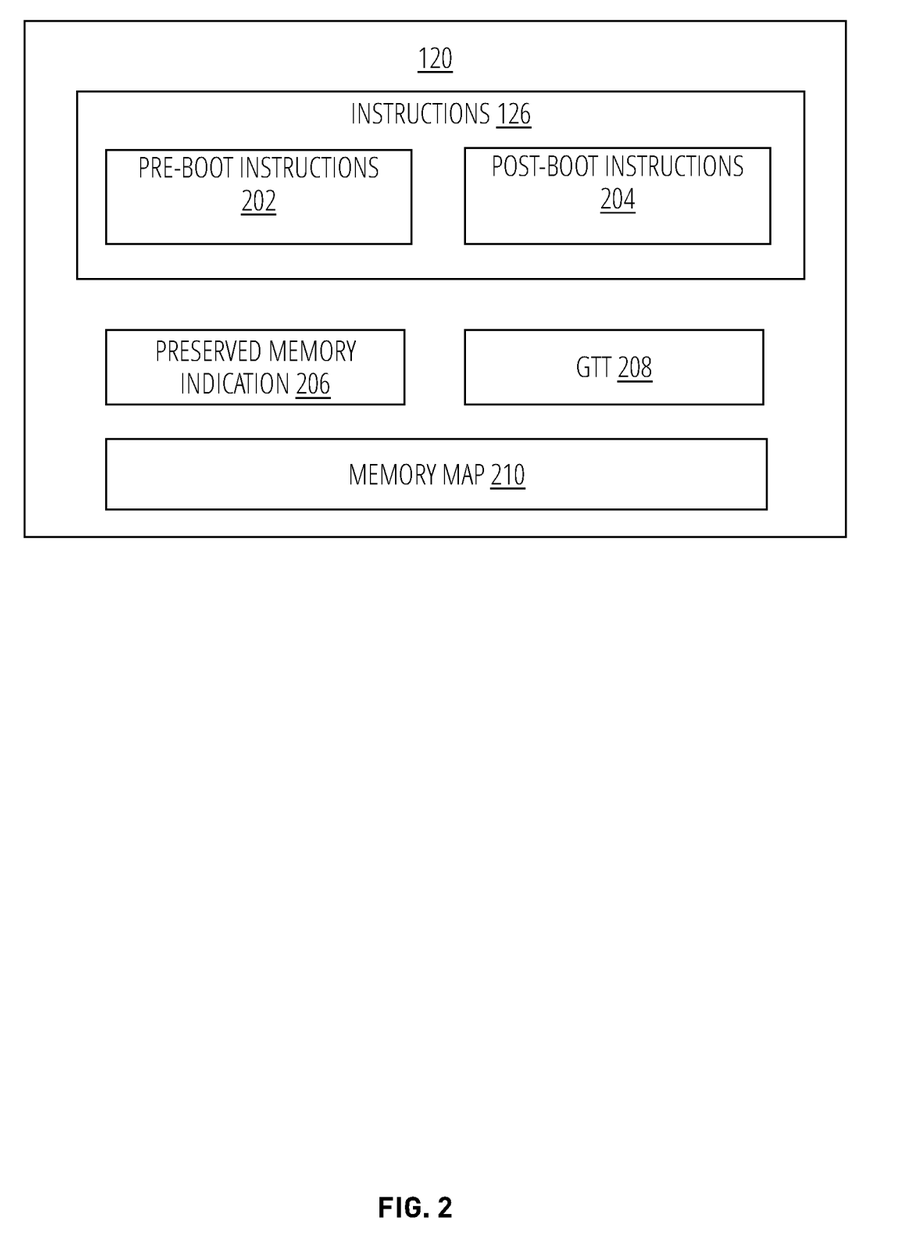
FIG. 2 illustrates a portion of a system 100 to preserve pre-boot allocated memory for post-boot.

FIG. 2 illustrates a portion of the system 100 of FIG. 1. The portion of system 100 depicted in this figure includes memory 120, which as described above can itself include volatile memory 122 and/or nonvolatile memory 124. Memory 120 can store (e.g., in volatile memory 122 and/or nonvolatile memory 124) instructions 126, which may include both pre-boot instructions 202 as well as post-boot instructions 204. In some examples, pre-boot instructions 202 can include a BIOS while post-boot instructions 204 can include an OS. Furthermore, pre-boot instructions 202 can include drivers for hardware components or other circuitry in system 100. For example, pre-boot instructions 202 can include drivers for display adapter 114 and display 102. Additionally, post-boot instructions 204 can include drivers. In some examples, the drivers in pre-boot instructions 202 are the same drivers in post-boot instructions 204.

Memory 120 may further store information element including a preserved memory indication 206 and GTT 208 (e.g., a graphics translation table). With some examples, the preserved memory indication 206 can include an EfiPreservedMemoryType, such as, for example may be supported by the Extensible Firmware Interface (EFI) or the Unified EFI (UEFI) specifications promulgated by the UEFI Forum. In general, GTT 208 (sometimes referred to a graphics address remapping table) provides for the exchange of data between memory 120 and display 102 via display adapter 114 such that textures, polygon meshes, and other data can be loaded and processed (e.g., via frame buffers, or the like). GTT 208 is particularly useful during pre-boot, for integrated graphics applications, or to expand the amount of dedicated graphics memory within a system. With some embodiments, memory 120 can also include an indication of a memory map 210. In general, memory map 210 is a data structure that contains indications of how memory 120 is laid out, for example, the total size of memory 120, reserved regions, regions having a particular usage, or the like.

Often, processor(s) 116, in executing pre-boot instructions 202 can generate memory map 210 and pass the memory map 210 to post-boot instructions 204 for use during operation of the system 100.

In the boot process, a memory map is passed on from the firmware in order to instruct an operating system kernel about memory layout. It contains the information regarding the size of total memory, any reserved regions and may also provide other details specific to the architecture.

Figure 3:
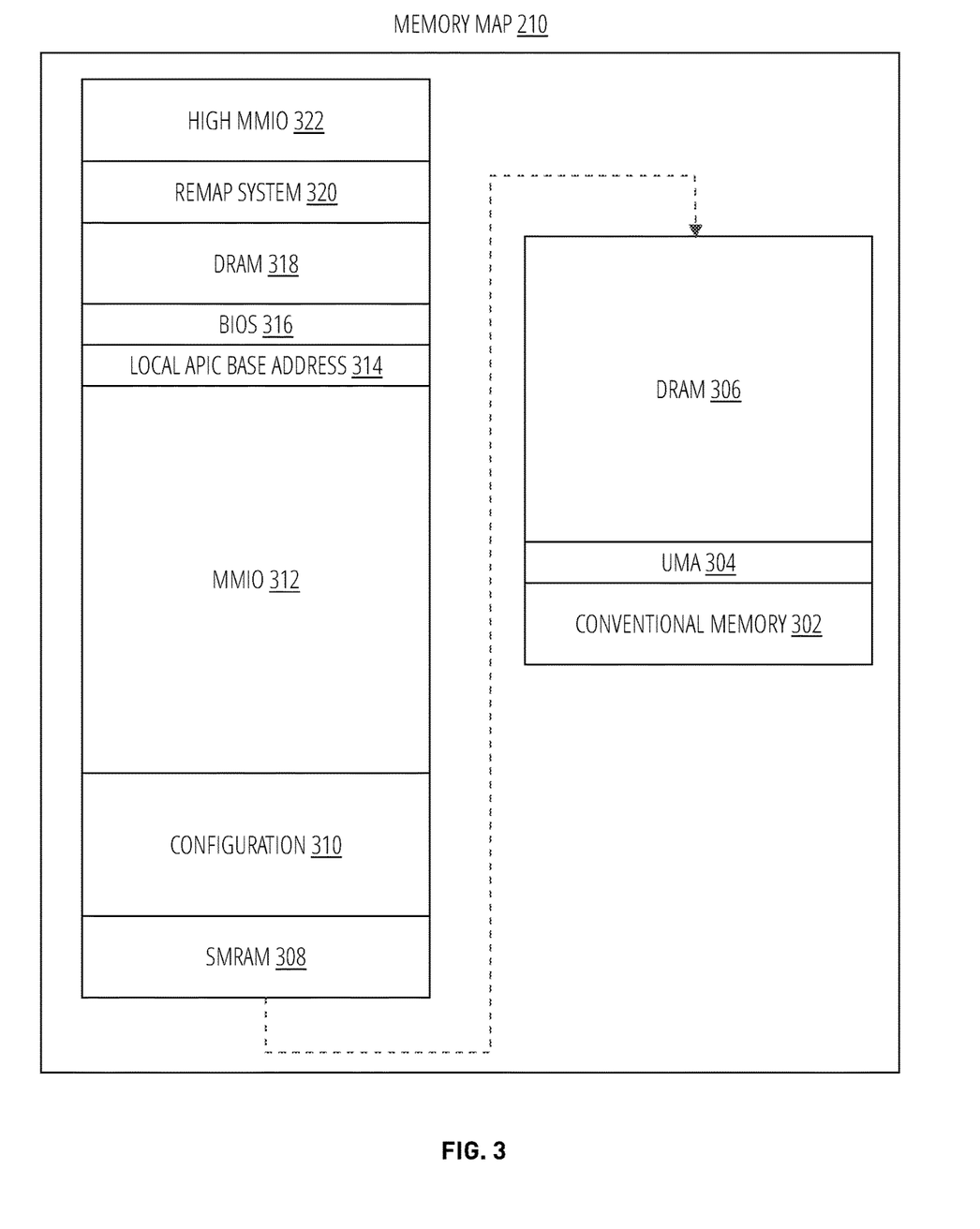
FIG. 3 illustrates memory map 210 of FIG. 2, detailing an example of memory allocated pre-boot that can be preserved for post-boot.

FIG. 3 illustrates an example of memory map 210, which may be representative a mapping of memory 120 of FIG. 1 or FIG. 2. It is noted, that memory map 210 is provided as an example only. In practice, systems can have any of a variety of memory structures and associated mappings. In general, memory map 210 can include indications of portions of memory 120 allocated for various purposes and can indicate details (e.g., memory address, physical memory address, virtual memory address, or the like) of the particular portion of memory 120 indicated in the memory map 210.

Memory map 210 can include indications of a conventional memory 302 region and a UMA 304 region (or upper memory area region). The conventional memory 302 region is typically the earliest or lowest address space of memory 120 and is reserved for legacy applications, such as, legacy DOS, legacy video adapters, or the like. Likewise, UMA 304 can refer to address space of memory 120 between 640 kB and 1024 kB (e.g., memory address 0xA0000 to 0xFFFFF). In some examples, multiple 128 kB regions are defined in the UMA 304. For example UMA 304 can include video adapter screen memory, device BIOS ROMs, and special RAM usually shared with physical devices (e.g., shared memory for network adapters, or the like).

Memory map 210 can further include indications of a first DRAM 306 region, an SMRAM 308 region and a configuration 310 region. DRAM 306 region can be used for storing instructions 126, such as, pre-boot instructions 202, post-boot instructions 204, or the like. SMRAM 308 region can be used to store instructions for a system management mode (SMM). Configuration 310 regions can be used for memory allocations for hardware components or circuitry of system 100. For example, configuration 310 region can be allocated for GSM, DSM, GT PSMI, RC6 context, doorbell context, PAVP WOPCM, DSM, or the like. As a specific example, configuration 310 region can be allocated for frame buffers, which can be used by display adapter 114 and/or other circuitry of system 100, in executing pre-boot instructions 202 to generate graphic information and cause such information to be displayed on display 102 prior to post-boot instructions 204 be executable by processor(s) 116.

Memory map 210 can also include indications of MMIO 312 region, local APIC base address 314, BIOS 316 region, DRAM 318 region, remap system 320 region, and a high MMIO 322 region. Although not depicted, between configuration 310 region and MMIO 312 region, memory map can include indications of a low MMIO region and a PCI express configuration region. Typically, addresses above the from the MMIO 312 region and higher (e.g., MMIO 312 region, local APIC base address 314 region, BIOS 316 region, etc.) can be remapped post boot. That is, processor(s) 116 in executing post-boot instructions 204 can remap, or reallocate memory addresses in this space. However, processor(s) 116 in executing pre-boot instructions 202 will allocate memory address below this space (e.g., configuration 310 region, SMRAM 308 region DRAM 306 region, UMA 304 region, and conventional memory 302 region). These regions are typically not available for release and/or reallocation by post-boot operations. Thus, any memory allocated in these regions by pre-boot operations but hot used by post-boot operations will generally be lost to the system 100.

Figure 4:
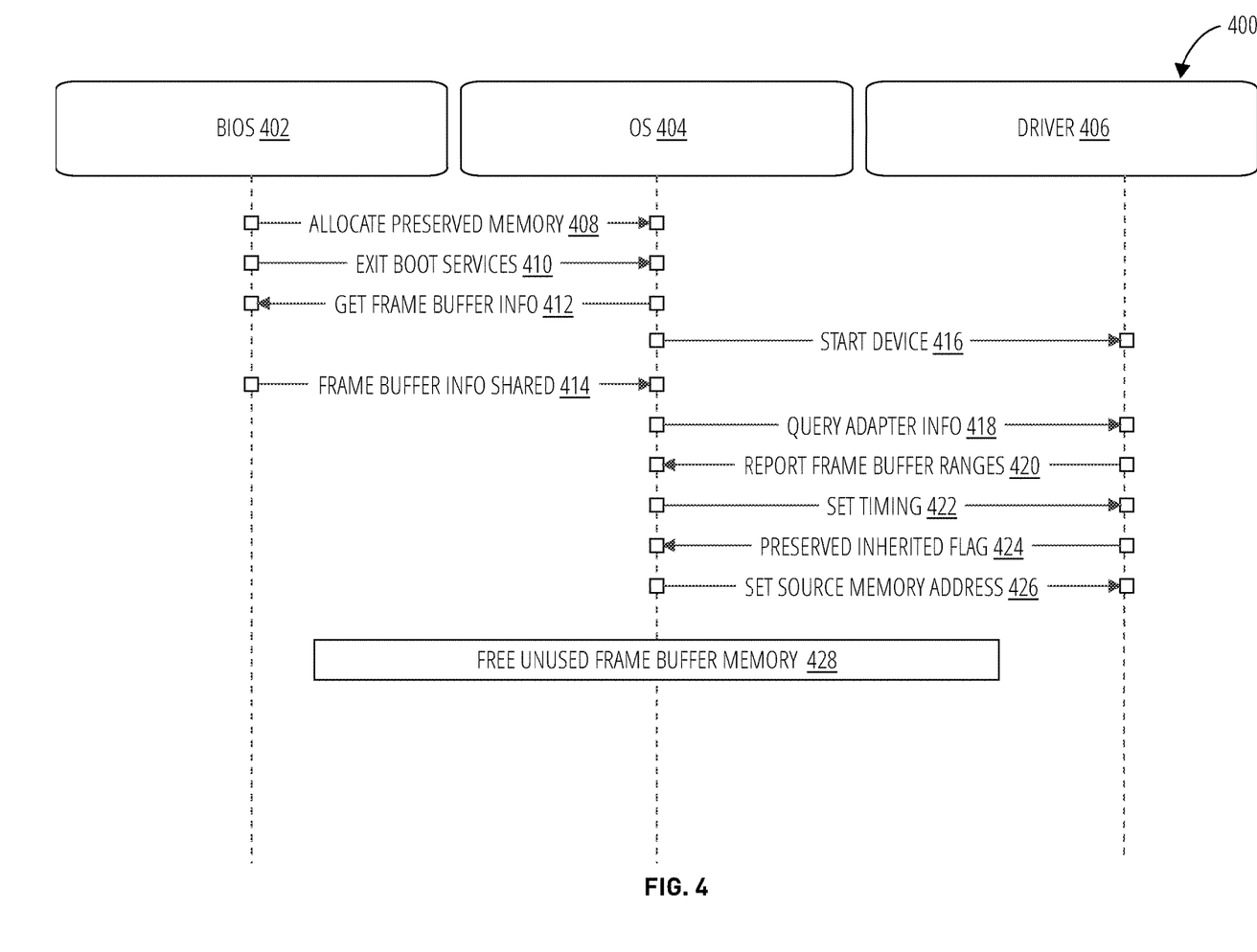
FIG. 4 illustrates a technique 400 to preserve pre-boot allocated memory for post-boot.

FIG. 4 illustrates a technique 400 for preserving pre-boot allocated memory for post-boot operations. In general, technique 400 can be implemented by a computing system, such as, system 100 of FIG. 1. Particularly, processor(s) 116 in executing pre-boot instructions 202 and post-boot instructions 204 can implement technique 400. For example, processor(s) 116 in executing pre-boot instructions 202 can implement operations associated with BIOS 402 of technique 400. Similarly, processor(s) 116 in executing post-boot instructions 204 can implement operations associated with OS 404 and driver 406 of technique 400.

Technique 400 can begin at operation 408. At operation 408, BIOS 402 can allocate a portion of memory 120 for use by circuitry or a hardware component of system 100. As a specific example, BIOS 402 can allocate a portion of memory 120 for frame buffers for use by display adapter 114. Further, at operation 408, BIOS 402 can mark the allocated portion of memory as a preserved memory type, such as, for example, a preserved EfiPreservedMemoryType. Continuing to operation 410, BIOS 402 can exit boot services, or said differently, complete boot operations and pass control to the OS 404.

At operation 412, OS 404 can request, or query, information regarding any preserved memory allocated by the BIOS 402. For example, OS 404 can query BIOS 402 for an indication of portions of memory 120 allocated during pre-boot operations and marked as preserved. Responsive to the OS 404 requesting information regarding memory allocated by the BIOS 402 as a preserved memory type, BIOS 402 can send an indication of the preserved memory to OS 404. For example, at operation 414 BIOS 402 can send preserved memory indication 206, GTT 208, or memory map 210 to OS 404.

At operation 416, OS 404 can start a device associated with the portion of memory 120 allocated by the BIOS 402 and preserved for post-boot operations. For example, OS 404 can start driver 406, where driver 406 can be associated with display adapter 114 and/or display 102. Furthermore, portions of memory 120 allocated by the BIOS 402 as frame buffers for display adapter 114. In a further example, OS 404 can issue DxgkDdiStartDevice command for the driver 406. At operation 418 the OS 404 can query information about the adapter (e.g., a display adapter 114, or the like) started at operation 416, such as, for example memory allocation information or the like. As a specific example, OS 404 can issue DxgkDdiQueryAdapterInfo command to driver 406. Responsive to the OS 404 requesting information regarding memory allocated by the driver 406, driver 406 can send an indication of the allocated memory to OS 404 at operation 420. For example, driver 460 can report indications of frame buffer memory allocated by driver 406.

At operation 422 OS 404 may modify and/or adjust parameters or settings of the circuitry (or hardware component) controlled by driver 406. For example, OS 404 can issue DxgkDdiSetTimingsFromVidPn command to driver 406 to modify timing of the display adapter 114.

At operation 424, driver 406 can set a flag (or provide another indication) to OS 404 to indicate to OS 404 that prior allocated memory for the adapter (e.g., display adapter 114, or the like) can be freed. For example, after driver 406 is started by the OS 404 and allocates a portion of memory 120 for the display adapter 114 post-boot, driver 406 can indicated that prior allocated memory (e.g., memory allocated pre-boot and preserved for post-boot operations) can be freed.

At operation 426, OS 404 can cause driver 406 to change an overlay setting. For example, OS 404 can issue command DxgkDdiSetVidPnSourceAddressWithMultiPlaneOverlay3 to driver 406 to cause driver 406 to change an overlay setting for display adapter 114. At operation 428, OS 404 can free portions of memory 120 allocated pre-boot and preserved for post-boot. For example, OS 404 can free portions of memory 120 indicated by the preserved memory indication 206, indicated in GTT 208, or indicated in memory map 210.

Figure 5:
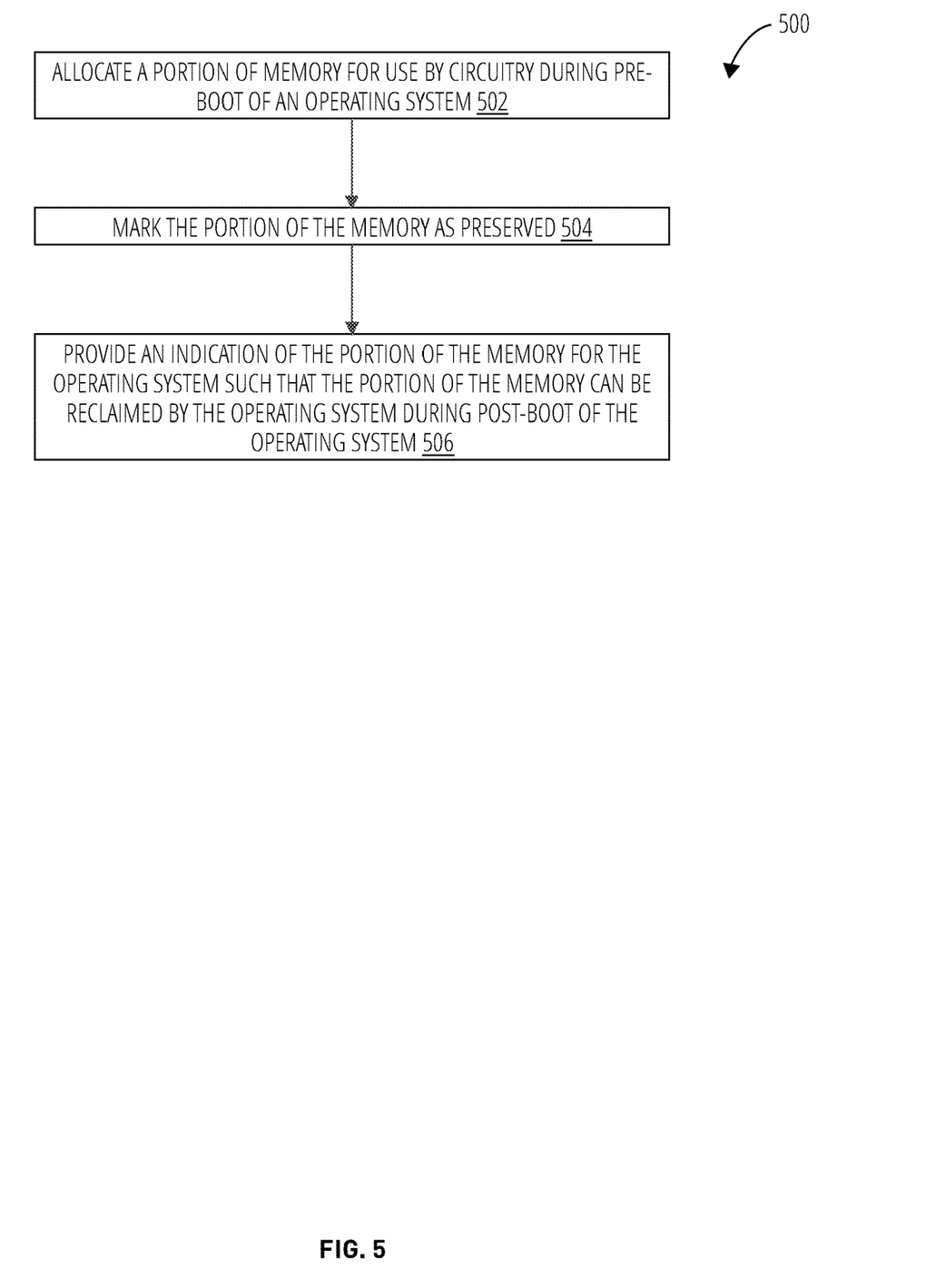
FIG. 5 illustrates a routine 500 in accordance with one embodiment.

FIG. 5 illustrates a routine 500 that can be implemented by pre-boot instructions (e.g., pre-boot instructions 202, BIOS 402, or the like) to allocate memory for pre-boot operations (e.g., of an adapter) and preserve the memory for post-boot operations. Routine 500 can begin at block 502. At block 502, routine 500 allocates a portion of memory for use by circuitry during pre-boot of an operating system. For example, BIOS 402 can allocate portions of memory 120 for operation of display adapter 114 and display 102 during per-boot operations. As a specific example, BIOS 402 can allocate portions of memory 120 as frame buffers for display adapter 114.

In block 504, routine 500 marks the portion of the memory as preserved. For example, BIOS 402 can mark the portions of memory 120 allocated for pre-boot operations as preserved (e.g., with EfiPreservedMemoryType indication, or the like). In block 506, routine 500 provides an indication of the portion of the memory for the operating system such that the portion of the memory can be reclaimed by the operating system during post-boot of the operating system. For example, BIOS 402 can provide an indication of the portions of memory 120 allocated and preserved to OS 404. For example, BIOS 402 can provide an indication of memory address associated with the preserved memory. As a specific example, BIOS 402 can provide preserved memory indication 206, GTT 208, memory map 210, or the like to OS 404.

Figure 6:
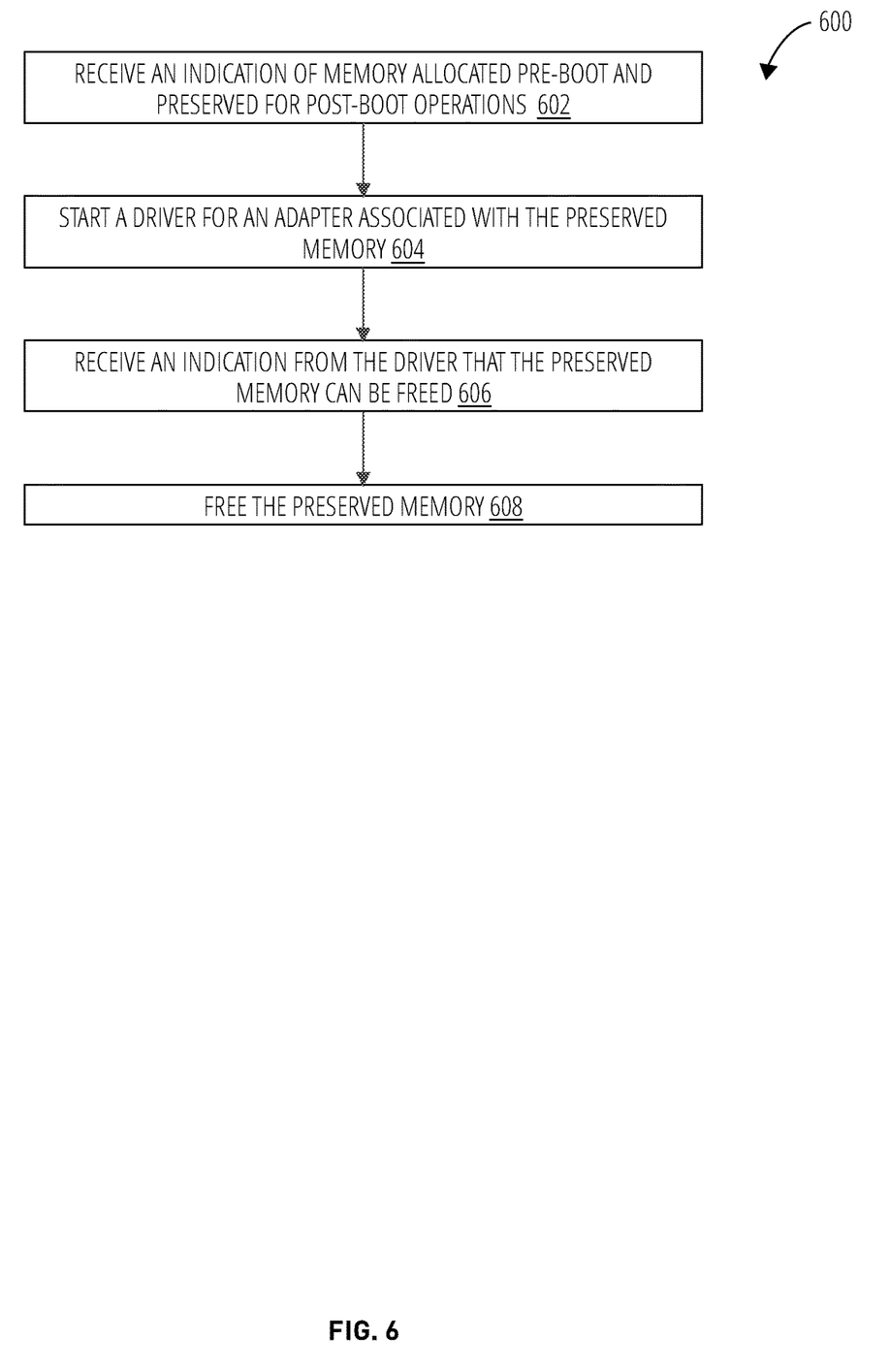
FIG. 6 illustrates a routine 600 in accordance with one embodiment.

FIG. 6 illustrates a routine 600 that can be implemented by post-boot instructions (e.g., post-boot instructions 204, OS 404, or the like) to reclaim memory allocated by pre-boot operations (e.g., of an adapter) and preserved for post-boot operations. Routine 600 can begin at block 602. At block 602, routine 600, routine 600 receives an indication of memory allocated by pre-boot operations and preserved for post-boot operations. For example, OS 404 can receive an indication (e.g., from BIOS 402, or the like) of a preserved memory type for portions of memory 120 allocated by the BIOS 402. As a specific example, OS 404 can receive an indication of memory (e.g., GOP framebuffer, or the like) allocated by BIOS 402 for an adapter (e.g., display adapter 114, or the like).

At block 604, routine 600 starts a driver for an adapter associated with the preserved memory. For example, OS 404 can start driver 406 where driver 406 is associated with the adapter for which BIOS 402 allocated the preserved memory indicated at block 602. As a specific example, OS 404 can start driver 406 for display adapter 114.

At block 606, routine 600 receives an indication from the driver that the preserved memory can be freed. For example, OS 404 can receive an indication from driver 406 (e.g., preserved inherited flag, or the like) indicating that portions of memory 120 allocated pre-boot and associated with the adapter (e.g., display adapter 114) can be freed. At block 608, routine 600 frees the preserved memory. For example, OS 404 frees the portions of memory 120 indicated as preserved by BIOS 402.

Figure 7:
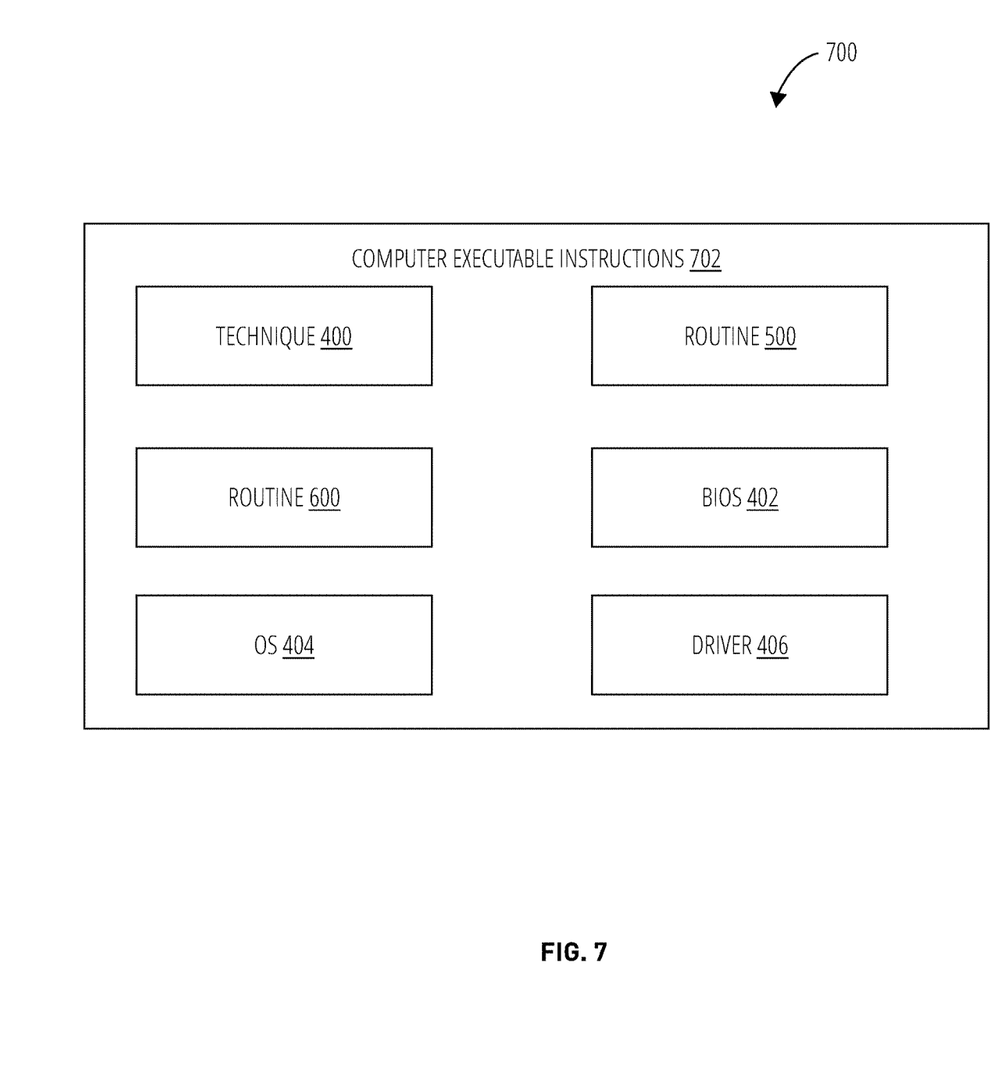
FIG. 7 illustrates a computer-readable storage medium 700 in accordance with one embodiment.

FIG. 7 illustrates computer-readable storage medium 700. Computer-readable storage medium 700 may comprise any non-transitory computer-readable storage medium or machine-readable storage medium, such as an optical, magnetic or semiconductor storage medium. In various embodiments, computer-readable storage medium 700 may comprise an article of manufacture. In some embodiments, 700 may store computer executable instructions 702 with which circuitry (e.g., processor(s) 116, or the like) can execute. For example, computer executable instructions 702 can include instructions to implement operations described with respect to technique 400, routine 500, routine 600, BIOS 402, OS 404, and/or driver 406. Examples of computer-readable storage medium 700 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 702 may include any suitable type of code, such as source code, compiled code, interpreted code, executable code, static code, dynamic code, object-oriented code, visual code, and the like.

Figure 8:
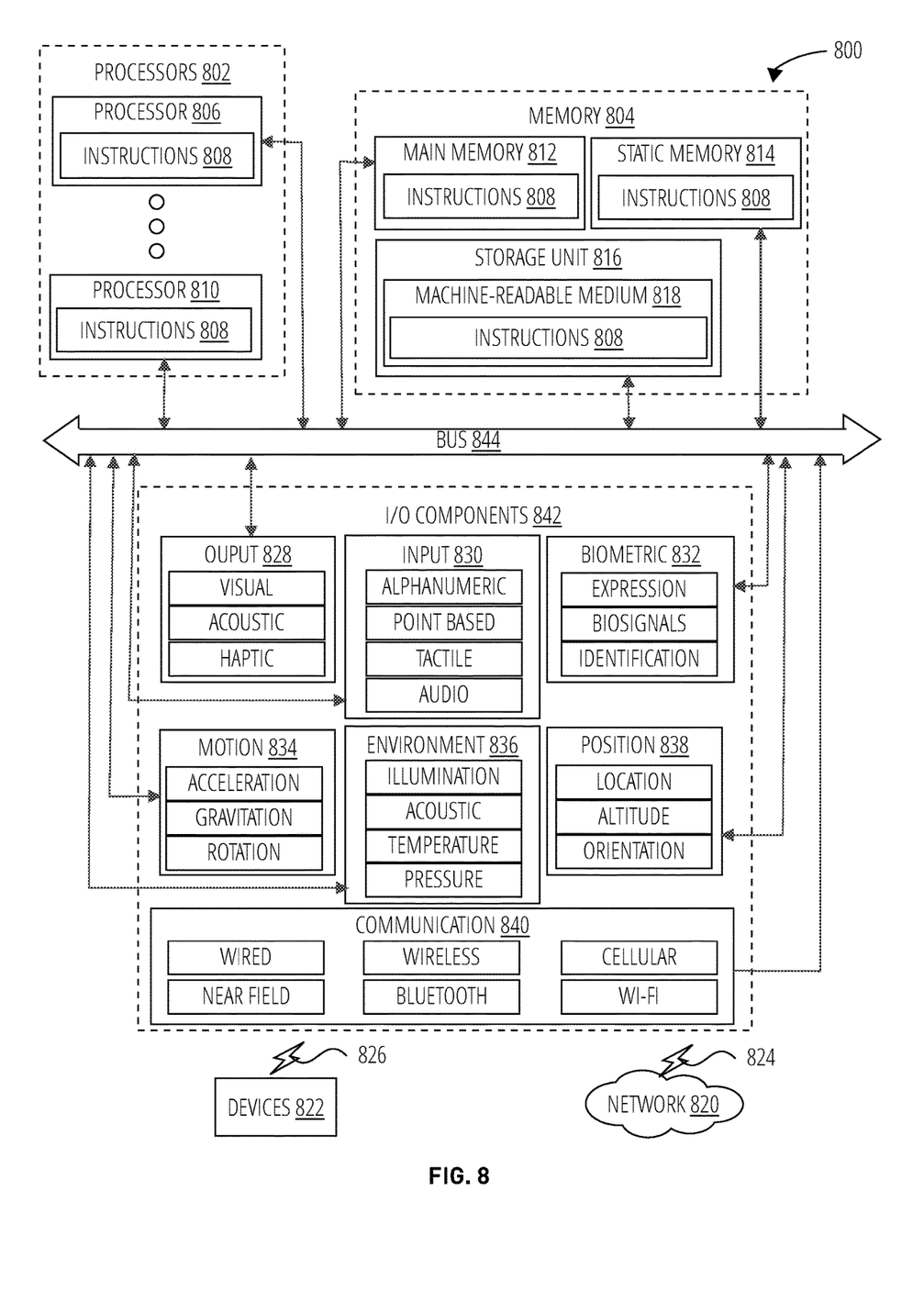
FIG. 8 illustrates a diagrammatic representation of a machine 800 in the form of a computer system within which a set of instructions may be executed for causing the machine to perform any one or more of the methodologies discussed herein, according to an example embodiment.

FIG. 8 illustrates a diagrammatic representation of a machine 800 in the form of a computer system within which a set of instructions may be executed for causing the machine to perform any one or more of the methodologies discussed herein. More specifically, FIG. 8 shows a diagrammatic representation of the machine 800 in the example form of a computer system, within which instructions 808 (e.g., software, a program, an application, an applet, an app, or other executable code) for causing the machine 800 to perform any one or more of the methodologies discussed herein may be executed. For example the instructions 808 may cause the machine 800 to execute technique 400 of FIG. 4, routine 500 of FIG. 5, routine 600 of FIG. 6, or the like. More generally, the instructions 808 may cause the machine 800 to allocate memory during pre-boot operations and preserve the memory for post-boot operations (or usage).

The instructions 808 transform the general, non-programmed machine 800 into a particular machine 800 programmed to carry out the described and illustrated functions in a specific manner. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 808, sequentially or otherwise, that specify actions to be taken by the machine 800. Further, while only a single machine 800 is illustrated, the term "machine" shall also be taken to include a collection of machines 200 that individually or jointly execute the instructions 808 to perform any one or more of the methodologies discussed herein.

The machine 800 may include processors 802, memory 804, and I/O components 842, which may be configured to communicate with each other such as via a bus 844. In an example embodiment, the processors 802 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 806 and a processor 810 that may execute the instructions 808. The term "processor" is intended to include multi-core processors that may comprise two or more independent processors (sometimes referred to as "cores") that may execute instructions contemporaneously. Although FIG. 8 shows multiple processors 802, the machine 800 may include a single processor with a single core, a single processor with multiple cores (e.g., a multi-core processor), multiple processors with a single core, multiple processors with multiples cores, or any combination thereof.

The memory 804 may include a main memory 812, a static memory 814, and a storage unit 816, both accessible to the processors 802 such as via the bus 844. The main memory 804, the static memory 814, and storage unit 816 store the instructions 808 embodying any one or more of the methodologies or functions described herein. The instructions 808 may also reside, completely or partially, within the main memory 812, within the static memory 814, within machine-readable medium 818 within the storage unit 816, within at least one of the processors 802 (e.g., within the processor's cache memory), or any suitable combination thereof, during execution thereof by the machine 800.

The I/O components 842 may include a wide variety of components to receive input, provide output, produce output, transmit information, exchange information, capture measurements, and so on. The specific I/O components 842 that are included in a particular machine will depend on the type of machine. For example, portable machines such as mobile phones will likely include a touch input device or other such input mechanisms, while a headless server machine will likely not include such a touch input device. It will be appreciated that the I/O components 842 may include many other components that are not shown in FIG. 8. The I/O components 842 are grouped according to functionality merely for simplifying the following discussion and the grouping is in no way limiting. In various example embodiments, the I/O components 842 may include output components 828 and input components 830. The output components 828 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 830 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 842 may include biometric components 832, motion components 834, environmental components 836, or position components 838, among a wide array of other components. For example, the biometric components 832 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 842 may include communication components 840 operable to couple the machine 800 to a network 820 or devices 822 via a coupling 824 and a coupling 826, respectively. For example, the communication components 840 may include a network interface component or another suitable device to interface with the network 820. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 822 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geolocation, location via Wi-Fi® signal triangulation, location via detecting an NFC beacon signal that may indicate a particular location, and so forth.

The various memories (i.e., memory 804, main memory 812, static memory 814, and/or memory of the processors 802) and/or storage unit 816 may store one or more sets of instructions and data structures (e.g., software) embodying or utilized by any one or more of the methodologies or functions described herein. These instructions (e.g., the instructions 808), when executed by processors 802, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 820 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 820 or a portion of the network 820 may include a wireless or cellular network, and the coupling 824 may be a Code Division Multiple Access (CDMA) connection, a Global System for Mobile communications (GSM) connection, or another type of cellular or wireless coupling. In this example, the coupling 824 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 808 may be transmitted or received over the network 820 using a transmission medium via a network interface device (e.g., a network interface component included in the communication components 840) and utilizing any one of a number of well-known transfer protocols (e.g., hypertext transfer protocol (HTTP)). Similarly, the instructions 808 may be transmitted or received using a transmission medium via the coupling 826 (e.g., a peer-to-peer coupling) to the devices 822. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 808 for execution by the machine 800, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Terms used herein should be accorded their ordinary meaning in the relevant arts, or the meaning indicated by their use in context, but if an express definition is provided, that meaning controls.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

The following examples pertain to further embodiments, from which numerous permutations and configurations will be apparent.

EXAMPLE 1

An apparatus, comprising: a processor; and memory storing instructions, which when executed by the processor, cause the processor to: allocate a portion of memory for use by circuitry during pre-boot of an operating system; mark the portion of the memory as preserved; and provide an indication of the portion of the memory for the operating system such that the portion of the memory can be reclaimed by the operating system during post-boot of the operating system.

EXAMPLE 2

The apparatus of example 1, the instructions, when executed by the processor, cause the processor to allocate the portion of the memory for use by a graphics output protocol (GOP) framebuffer.

EXAMPLE 3

The computing apparatus of example 2, the instructions, when executed by the processor, cause the processor to dynamically allocate the portion of memory based on the GOP framebuffer contents.

EXAMPLE 4

The computing apparatus of example 2, the instructions, when executed by the processor, cause the processor to populate a graphics translation table (GTT) based on a memory address of the portion of memory.

EXAMPLE 5

The computing apparatus of example 2, the instructions, when executed by the processor, cause the processor to provide a memory address of the portion of memory as the indication.

EXAMPLE 6

The computing apparatus of example 2, the GOP framebuffer arranged to store video display data.

EXAMPLE 7

The computing apparatus of example 1, the instructions, when executed by the processor, cause the processor to mark the portion of the memory as a preserved memory type specified by the UEFI Specification.

EXAMPLE 8

The computing apparatus of example 7, the preserved memory type an EfiPreservedMemoryType.

EXAMPLE 9

A non-transitory computer-readable storage medium, the computer-readable storage medium including instructions that when executed by circuitry, cause the circuitry to: allocate a portion of memory for use by circuitry during pre-boot of an operating system; mark the portion of the memory as preserved; and provide an indication of the portion of the memory for the operating system such that the portion of the memory can be reclaimed by the operating system during post-boot of the operating system.

EXAMPLE 10

The computer-readable storage medium of example 9, the instructions, when executed by the circuitry, cause the circuitry to allocate the portion of the memory for use by a graphics output protocol (GOP) framebuffer.

EXAMPLE 11

The computer-readable storage medium of example 10, the instructions, when executed by the circuitry, cause the circuitry to dynamically allocate the portion of memory based on the GOP framebuffer contents.

EXAMPLE 12

The computer-readable storage medium of example 10, the instructions, when executed by the circuitry, cause the circuitry to populate a graphics translation table (GTT) based on a memory address of the portion of memory.

EXAMPLE 13

The computer-readable storage medium of example 10, the instructions, when executed by the circuitry, cause the circuitry to provide a memory address of the portion of memory as the indication.

EXAMPLE 14

The computer-readable storage medium of example 10, the GOP framebuffer arranged to store video display data.

EXAMPLE 15

The computer-readable storage medium of example 9, the instructions, when executed by the circuitry, cause the circuitry to mark the portion of the memory as a preserved memory type specified by the UEFI Specification.

EXAMPLE 16

The computer-readable storage medium of example 15, the preserved memory type an EfiPreservedMemoryType.

EXAMPLE 17

A method, comprising: allocating a portion of memory for use by circuitry during pre-boot of an operating system; marking the portion of the memory as preserved; and providing an indication of the portion of the memory for the operating system such that the portion of the memory can be reclaimed by the operating system during post-boot of the operating system.

EXAMPLE 18

The method of example 17, comprising allocating the portion of the memory for use by a graphics output protocol (GOP) framebuffer.

EXAMPLE 19

The method of example 18, comprising dynamically allocating the portion of memory based on the GOP framebuffer contents.

EXAMPLE 20

The method of example 18, comprising populating a graphics translation table (GTT) based on a memory address of the portion of memory.

EXAMPLE 21

The method of example 18, comprising providing a memory address of the portion of memory as the indication.

EXAMPLE 22

The method of example 18, the GOP framebuffer arranged to store video display data.

EXAMPLE 23

The method of example 17, comprising marking the portion of the memory as a preserved memory type specified by the UEFI Specification.

EXAMPLE 24

The method of example 23, the preserved memory type an EfiPreservedMemoryType.

EXAMPLE 25

A method, comprising: receiving an indication of a portion of memory allocated for use by circuitry during a pre-boot operation and preserved for post-boot operation; determining whether the portion of memory is currently in use by the circuitry; and releasing the portion of memory based on a determination that the portion of memory is not currently in use by the circuitry.

EXAMPLE 26

The method of example 25, wherein the portion of the memory is allocated as a graphics output protocol (GOP) framebuffer.

EXAMPLE 27

The method of example 26, comprising removing a memory address of the portion of memory from a graphics translation table (GTT) to release the portion of memory.

EXAMPLE 28

The method of example 26, the GOP framebuffer arranged to store video display data.

EXAMPLE 29

The method of example 25, the indication comprising a flag marking the portion of the memory as a preserved memory type specified by the UEFI Specification.

EXAMPLE 30

The method of example 29, the preserved memory type an EfiPreservedMemoryType.

EXAMPLE 31

An apparatus, comprising means for performing the method of any one of examples 17 to 30.

EXAMPLE 32

An apparatus, comprising: a processor; and memory storing instructions, which when executed by the processor, cause the processor to receive an indication of a portion of memory allocated for use by circuitry during a pre-boot operation and preserved for post-boot operation; determine whether the portion of memory is currently in use by the circuitry; and release the portion of memory based on a determination that the portion of memory is not currently in use by the circuitry.

EXAMPLE 33

The apparatus of example 32, wherein the portion of the memory is allocated as a graphics output protocol (GOP) framebuffer.

EXAMPLE 34

The apparatus of example 33, the instructions, when executed by the processor, cause the processor to remove a memory address of the portion of memory from a graphics translation table (GTT) to release the portion of memory.

EXAMPLE 35

The apparatus of example 33, the GOP framebuffer arranged to store video display data.

EXAMPLE 36

The apparatus of example 32, the indication comprising a flag marking the portion of the memory as a preserved memory type specified by the UEFI Specification.

EXAMPLE 37

The apparatus of example 36, the preserved memory type an EfiPreservedMemoryType.

EXAMPLE 38

A non-transitory computer-readable storage medium, the computer-readable storage medium including instructions that when executed by circuitry, cause the circuitry to: receive an indication of a portion of memory allocated for use by circuitry during a pre-boot operation and preserved for post-boot operation; determine whether the portion of memory is currently in use by the circuitry; and release the portion of memory based on a determination that the portion of memory is not currently in use by the circuitry.

EXAMPLE 39

The computer-readable storage medium of example 38, wherein the portion of the memory is allocated as a graphics output protocol (GOP) framebuffer.

EXAMPLE 40

The computer-readable storage medium of example 39, the instructions, when executed by the circuitry, cause the circuitry to remove a memory address of the portion of memory from a graphics translation table (GTT) to release the portion of memory.

EXAMPLE 41

The computer-readable storage medium of example 39, the GOP framebuffer arranged to store video display data.

EXAMPLE 42

The computer-readable storage medium of example 38, the indication comprising a flag marking the portion of the memory as a preserved memory type specified by the UEFI Specification.

EXAMPLE 43

The computer-readable storage medium of example 42, the preserved memory type an EfiPreservedMemoryType.

What is claimed is:

1. A computing apparatus, comprising:
a processor; and
a memory storing instructions, which when executed by the processor, cause the processor to:
allocate a portion of memory dynamically for use by graphics circuitry during pre-boot of an operating system for use by a graphics output protocol (GOP) framebuffer;
mark the portion of the memory as preserved to store graphics information for the graphics circuitry during the pre-boot of the operating system and reclaimable by the operating system during post-boot of the operating system; and
provide an indication of the portion of the memory for the operating system such that the portion of the memory dynamically allocated during the pre-boot of the operating system can be reclaimed by the operating system during the post-boot of the operating system, wherein the reclaimed portion of memory is available for reallocation by the operating system for post-boot operations.

2. The computing apparatus of claim 1, the instructions, when executed by the processor, cause the processor to dynamically allocate the portion of memory based on the GOP framebuffer contents.

3. The computing apparatus of claim 1, the instructions, when executed by the processor, cause the processor to populate a graphics translation table (GTT) based on a memory address of the portion of memory.

4. The computing apparatus of claim 1, the instructions, when executed by the processor, cause the processor to provide a memory address of the portion of memory as the indication.

5. The computing apparatus of claim 1, the GOP framebuffer arranged to store video display data.

6. The computing apparatus of claim 1, the instructions, when executed by the processor, cause the processor to mark the portion of the memory as a preserved memory type specified by a unified extensible firmware interface (UEFI) Specification.

7. The computing apparatus of claim 6, the preserved memory type an EfiPreservedMemoryType.

8. A non-transitory computer-readable storage medium, the computer-readable storage medium including instructions that when executed by circuitry, cause the circuitry to:
allocate a portion of memory dynamically for use by graphics circuitry during pre-boot of an operating system for use by a graphics output protocol (GOP) framebuffer;
mark the portion of the memory as preserved to store graphics information for the graphics circuitry during the pre-boot of the operating system and reclaimable by the operating system during post-boot of the operating system; and
provide an indication of the portion of the memory for the operating system such that the portion of the memory dynamically allocated during the pre-boot of the operating system can be reclaimed by the operating system during the post-boot of the operating system, wherein the reclaimed portion of memory is available for reallocation by the operating system for post-boot operations.

9. The computer-readable storage medium of claim 8, the instructions, when executed by the circuitry, cause the circuitry to dynamically allocate the portion of memory based on the GOP framebuffer contents.

10. The computer-readable storage medium of claim 8, the instructions, when executed by the circuitry, cause the circuitry to populate a graphics translation table (GTT) based on a memory address of the portion of memory.

11. The computer-readable storage medium of claim 8, the instructions, when executed by the circuitry, cause the circuitry to provide a memory address of the portion of memory as the indication.

12. The computer-readable storage medium of claim 8, the GOP framebuffer arranged to store video display data.

13. The computer-readable storage medium of claim 8, the instructions, when executed by the circuitry, cause the circuitry to mark the portion of the memory as a preserved memory type specified by a unified extensible firmware interface (UEFI) Specification.

14. The computer-readable storage medium of claim 13, the preserved memory type an EfiPreservedMemoryType.

15. A method, comprising:
dynamically allocating a portion of memory for use by graphics circuitry during pre-boot of an operating system for use by a graphics output protocol (GOP) framebuffer;
marking the portion of the memory as preserved to store graphics information for the graphics circuitry during the pre-boot of the operating system and reclaimable by the operating system during post-boot of the operating system; and
providing an indication of the portion of the memory for the operating system such that the portion of the memory dynamically allocated during the pre-boot of the operating system can be reclaimed by the operating system during the post-boot of the operating system, wherein the reclaimed portion of memory is available for reallocation by the operating system for post-boot operations.

16. The method of claim 15, wherein the portion of memory is dynamically allocated based on the GOP framebuffer contents.

17. The method of claim 15, comprising populating a graphics translation table (GTT) based on a memory address of the portion of memory.

18. The method of claim 15, comprising providing a memory address of the portion of memory as the indication.

19. The method of claim 15, the GOP framebuffer arranged to store video display data.

20. The method of claim 15, comprising marking the portion of the memory as a preserved memory type specified by the UEFI Specification.

21. The method of claim 20, the preserved memory type an EfiPreservedMemoryType.

* * * * *